No. 842,455. PATENTED JAN. 29, 1907.
J. E. GLEASON.
GEAR CUTTING MACHINE.
APPLICATION FILED DEC. 27, 1904.
7 SHEETS—SHEET 1.
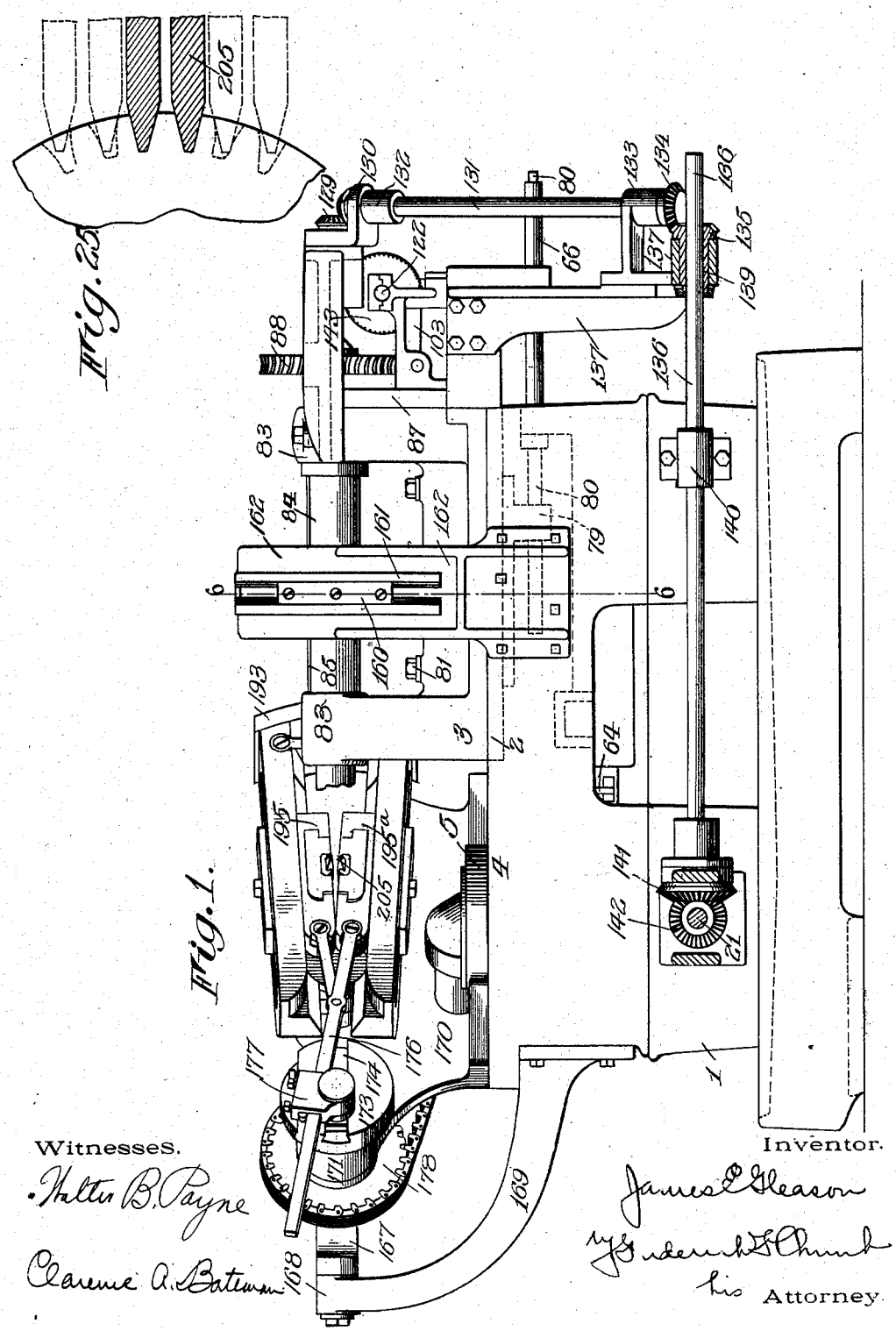
Witnesses.
Walter B. Payne
Clarence A. Bateman
Inventor.
James E. Gleason
Frederick F. Church
his Attorney.

No. 842,455.
PATENTED JAN. 29, 1907.
J. E. GLEASON.
GEAR CUTTING MACHINE.
APPLICATION FILED DEC. 27, 1904.
7 SHEETS—SHEET 2.
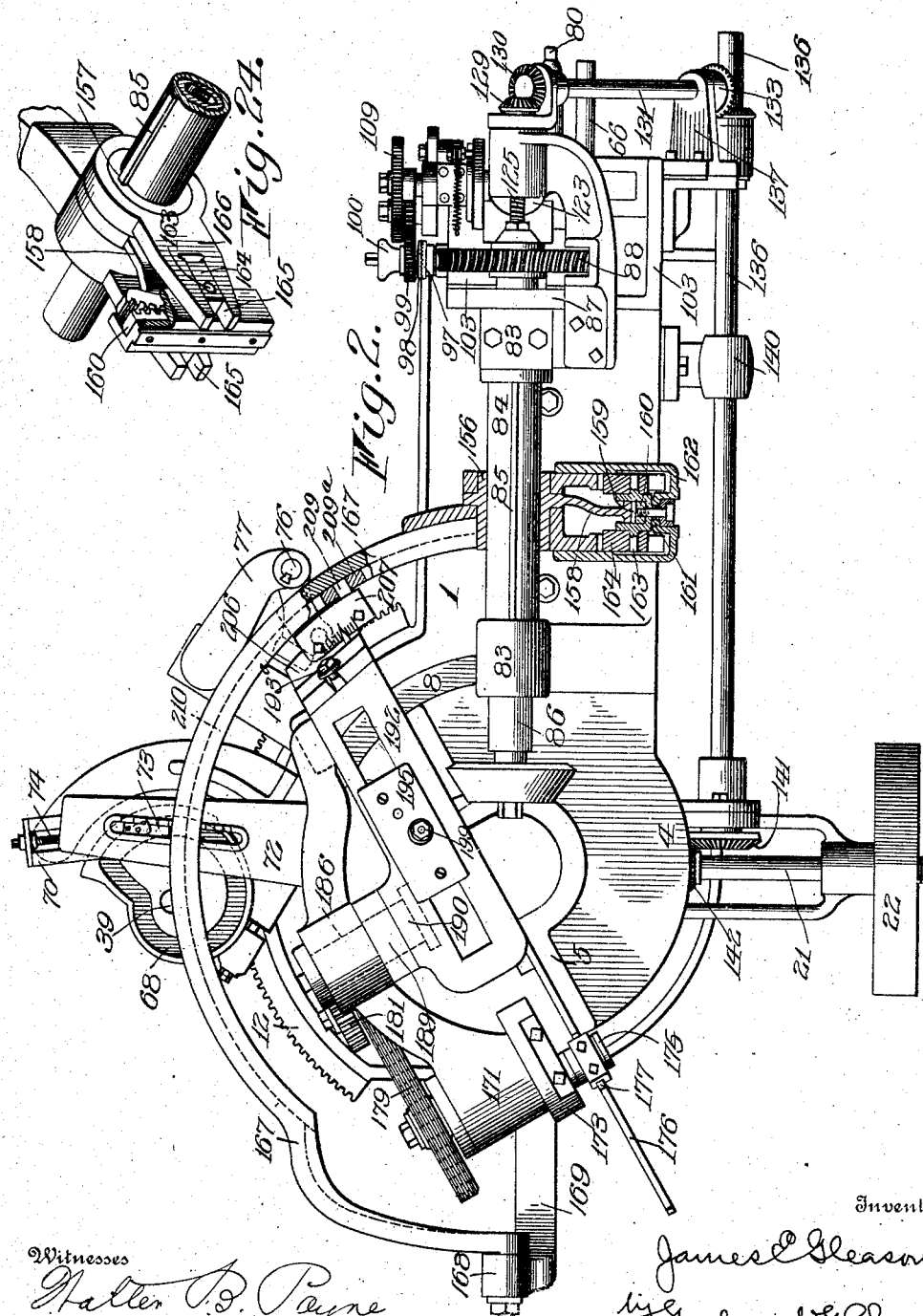

No. 842,455. PATENTED JAN. 29, 1907.
J. E. GLEASON.
GEAR CUTTING MACHINE.
APPLICATION FILED DEC. 27, 1904.
7 SHEETS—SHEET 3.
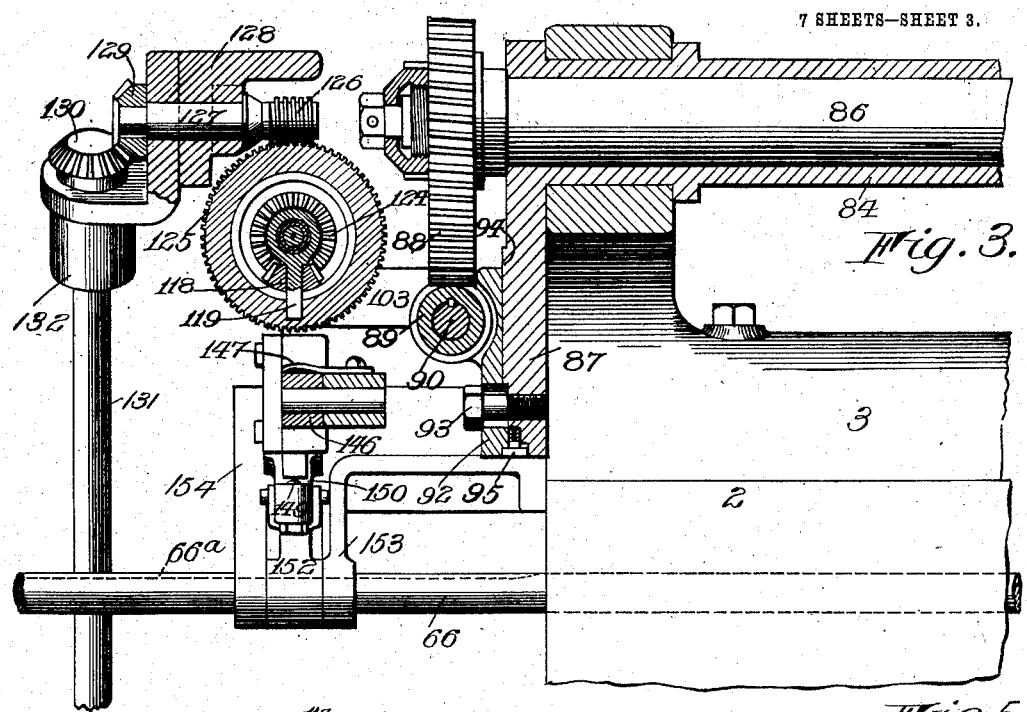
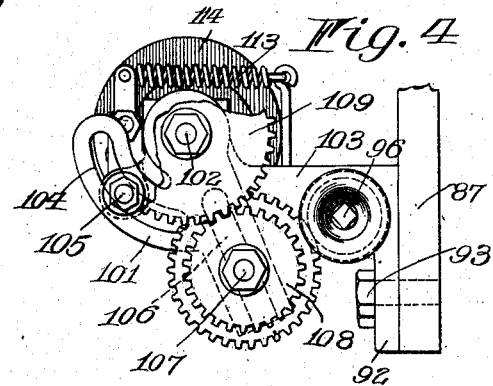
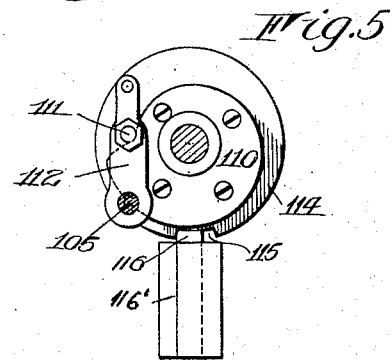
Witnesses.
Inventor.

No. 842,455. PATENTED JAN. 29, 1907.
J. E. GLEASON.
GEAR CUTTING MACHINE.
APPLICATION FILED DEC. 27, 1904.
7 SHEETS—SHEET 4.
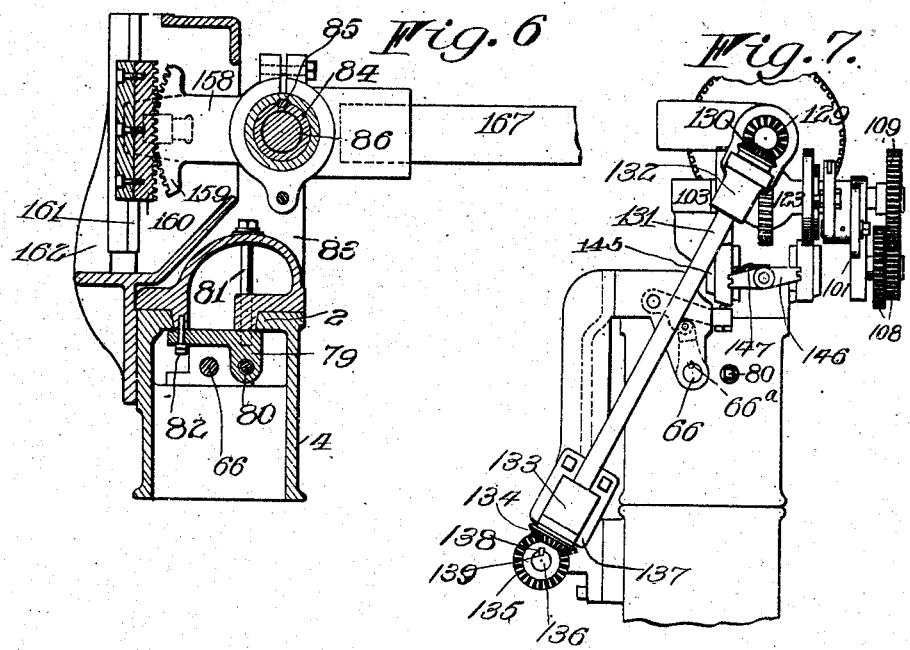
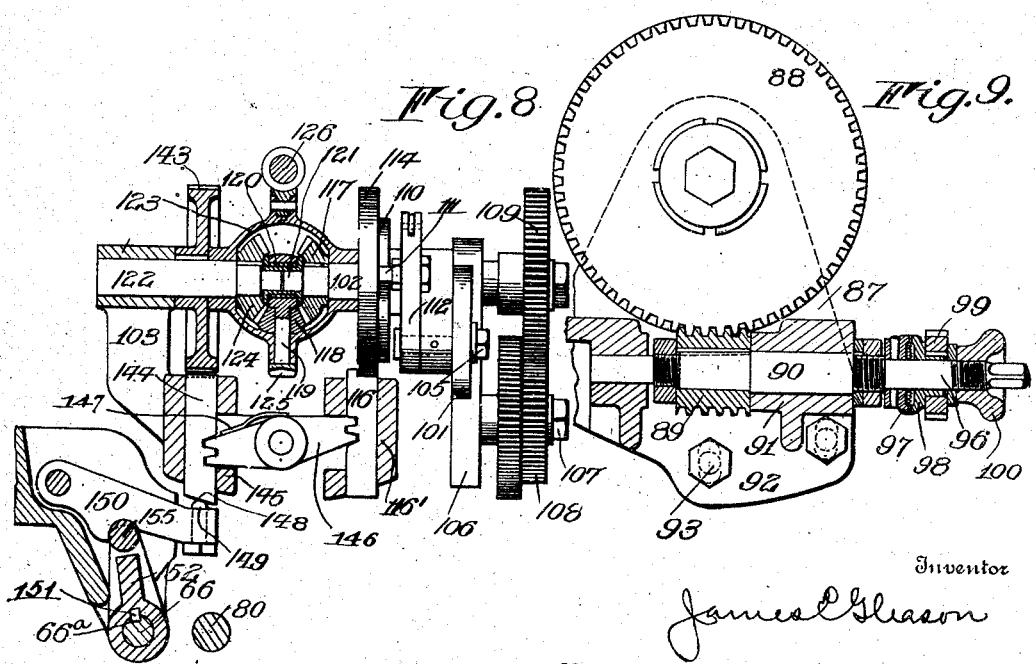

No. 842,455. PATENTED JAN. 29, 1907.
J. E. GLEASON.
GEAR CUTTING MACHINE.
APPLICATION FILED DEC. 27, 1904.
7 SHEETS—SHEET 5.
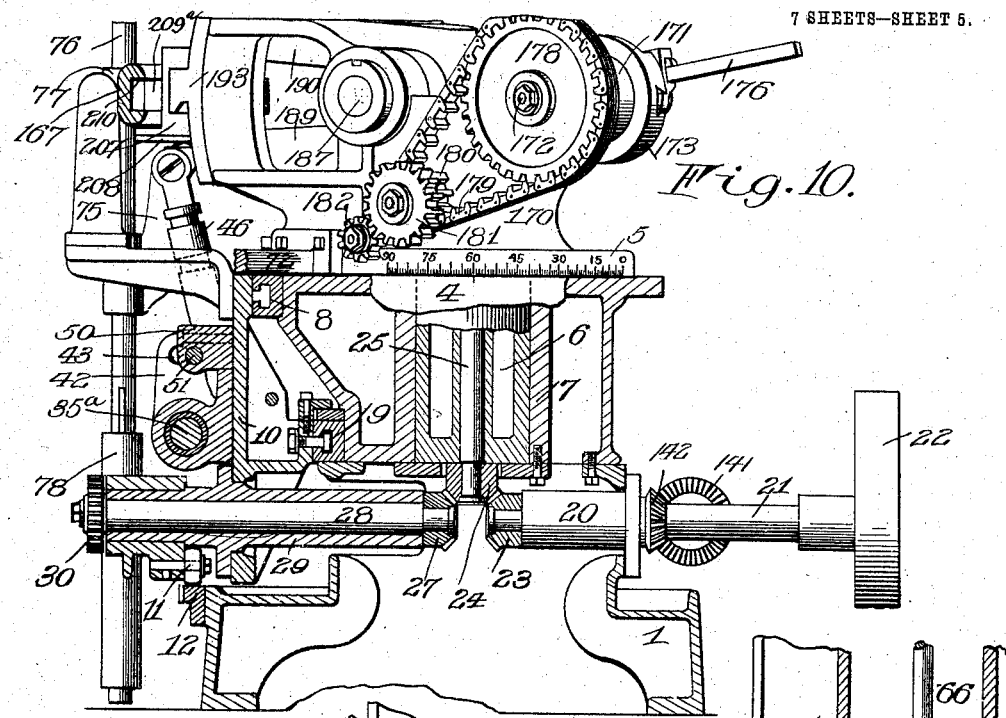
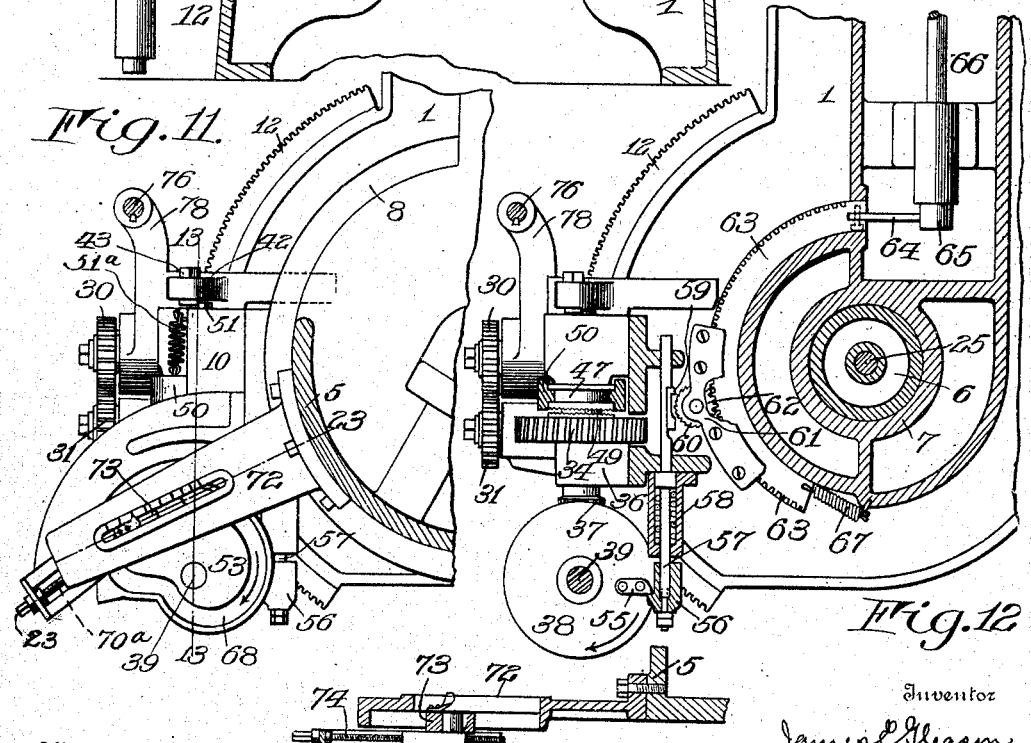
Witnesses
Walter B. Payne.
Clarence A. Bateman.
Inventor
James E. Gleason
by Frederick S. Church
his Attorney No. 842,455. PATENTED JAN. 29, 1907.
J. E. GLEASON.
GEAR CUTTING MACHINE.
APPLICATION FILED DEC. 27, 1904.
7 SHEETS—SHEET 6.
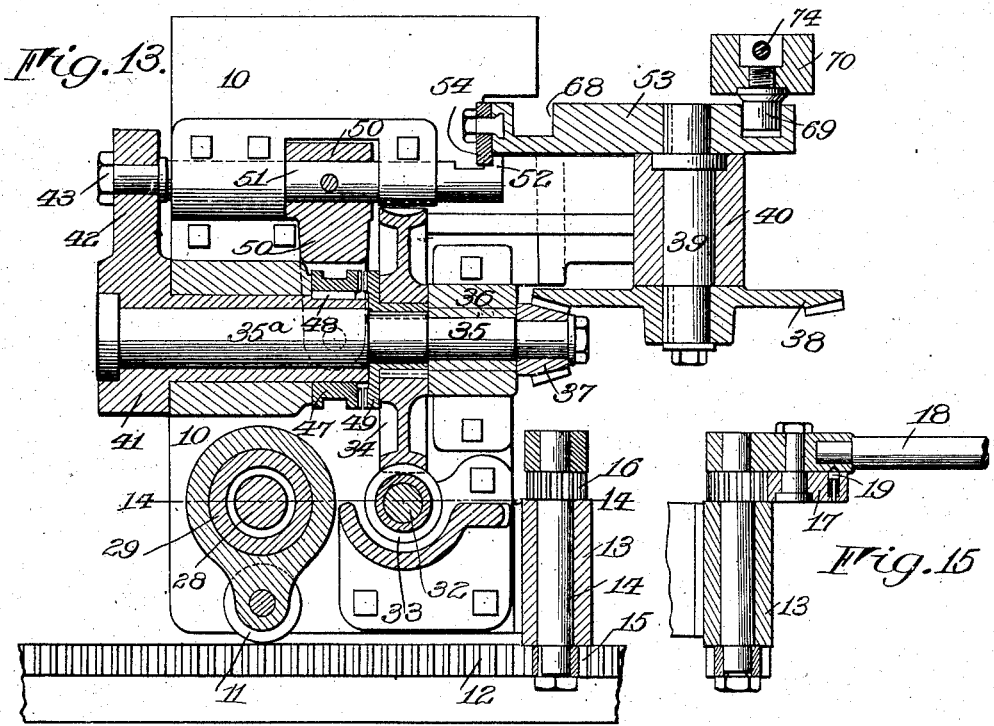
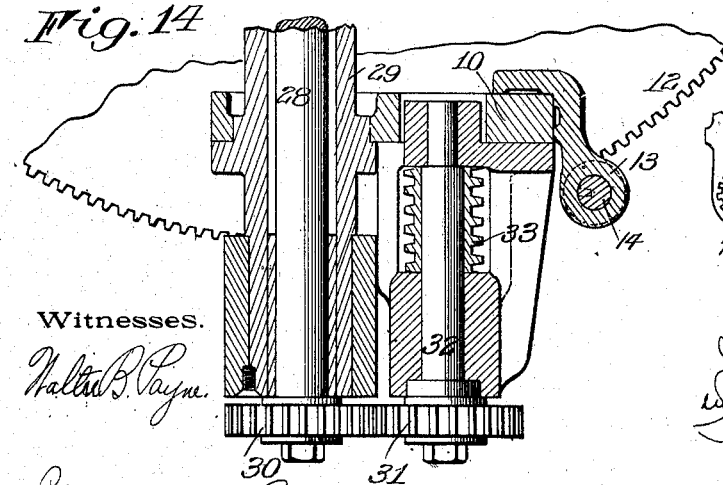
Witnesses.
Walter B. Payne.
Clarence A. Bateman.
Inventor.
James E. Gleason
Attorney

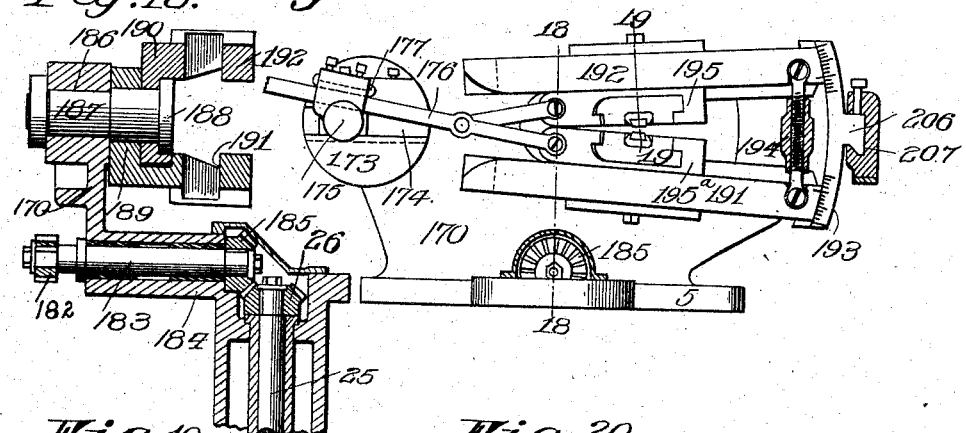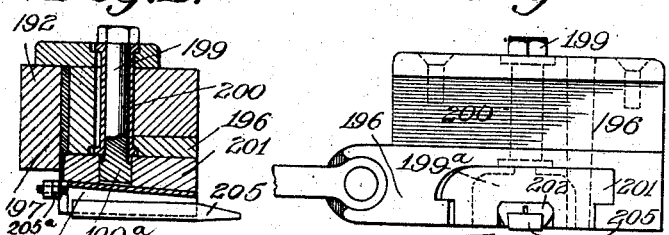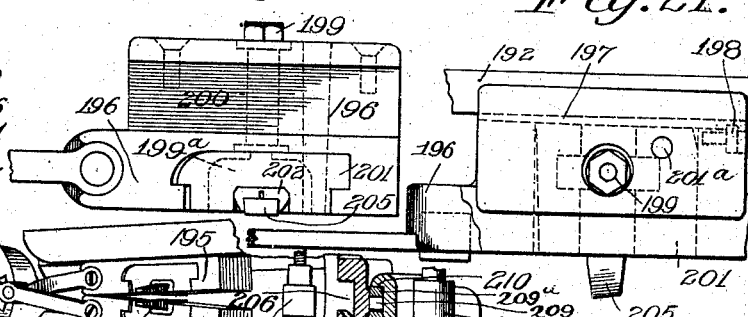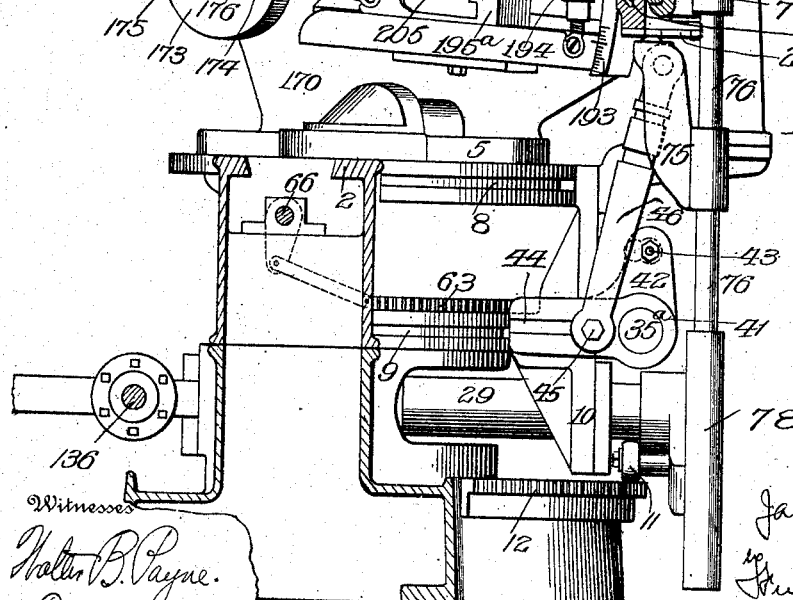

UNITED STATES PATENT OFFICE.

JAMES E. GLEASON, OF ROCHESTER, NEW YORK, ASSIGNOR TO THE GLEASON WORKS, OF ROCHESTER, NEW YORK, A CORPORATION OF NEW YORK.

GEAR-CUTTING MACHINE.

No. 842,455.	Specification of Letters Patent.	Patented Jan. 29, 1907.

Application filed December 27, 1904. Serial No. 238,350.

*To all whom it may concern:*

Be it known that I, JAMES E. GLEASON, of Rochester, in the county of Monroe and State of New York, have invented certain new and useful Improvements in Gear-Cutting Machines; and I do hereby declare the following to be a full, clear, and exact description of the same, reference being had to the accompanying drawings, forming a part of this specification, and to the reference-numerals marked thereon.

My present invention relates to improvements in gear-cutting machines, and more particularly those which are especially adapted to cutting bevel-gears; and it is the purpose of my invention to provide a device of this character which is capable of correctly and expeditiously generating the teeth of the gears by a series of successive operations which are rendered automatic by the use of the operating devices that form a part of my invention.

To these and other ends the invention consists in certain improvements and combinations and arrangements of parts, that will be hereinafter more fully described, the novel features being pointed out particularly in the claims at the end of the specification.

In the drawings, Figure 1 is a side elevation of a device of this character constructed in accordance with my invention. Fig. 2 is a plan view of the same. Fig. 3 is a fragmentary view, on an enlarged scale, showing the operating devices for the gear-blank and the contiguous parts in section. Fig. 4 is a detail view of the change-gearing for the blank-operating device, showing them detached from the machine. Fig. 5 is a detail view of the stop mechanism for controlling the operation of the blank-operating devices. Fig. 6 is a transverse sectional view on the line 6 6 of Fig. 1 looking in the direction of the arrow, parts being broken away and omitted. Fig. 7 is a fragmentary end view of the machine looking from the right in Figs. 1 and 2, parts being omitted. Fig. 8 is a detail sectional view showing the operating devices for the gear-blank and the stop mechanism for controlling the operation thereof. Fig. 9 is an enlarged view of the worm-wheel and its operating-worm, which serve to connect the change-gearing with the arbor supporting the gear-blank. Fig. 10 is an end elevation with the supporting-base and contiguous parts in section, showing the operating devices for the tools and related parts. Fig. 11 is a fragmentary plan view of the carrier and supporting-base with parts thereof omitted, showing the cam-controlled devices for feeding the tools. Fig. 12 is a sectional plan view through the supporting-base with parts omitted, showing the mechanism for setting into operation the blank-operating devices. Fig. 13 is a sectional view on the line 13 13 of Fig. 11, showing the operating mechanism for shifting the plane of motion of the tools. Fig. 14 is a sectional view on the line 14 14 of Fig. 13, showing the driving means for the tool-operating devices. Figs. 15 and 16 are detail views of a device which may be employed for shifting the tool-operating devices in a circular path around the supporting-base. Fig. 17 is an elevation of the tools and their supports. Fig. 18 is a transverse sectional view on the line 18 18 of Fig. 17, showing the method of mounting the tool-supporting devices. Fig. 19 is a detail sectional view on the section 19 19 of Fig. 17, showing the method employed in the present instance for locking the tool to its holder. Figs. 20 and 21 are detail views in elevation and plan, respectively, showing the construction of the tool-holders and the method in which they are mounted. Fig. 22 shows the operating mechanism for shifting the directions of motion of the tools in a manner that will be hereinafter described, the supporting-base being shown in section and parts of the device being broken away or omitted; and Fig. 23 is a sectional view on the line 23 23 of Fig. 11, showing the operating connections between the cam and the turret. Fig. 24 is an enlarged view showing the operating mechanism which is employed for transmitting motion between the tool-supporting arm and the blank-supporting arbor; and Fig. 25 is a diagrammatic view showing the manner in which the tools operate upon the blank to generate the teeth therefor, the successive positions of the tools and the blank being indicated in dotted lines.

Similar parts are designated by the same numerals of reference in the several views.

My invention in its present form embodies a machine which is particularly adapted for use in forming the teeth on bevel-gears, which renders the operation expeditious and at the same time enables the peculiar form of tooth which is necessary for the proper operation of bevel-gears to be accurately generated and uniformly cut. Such a machine embodies generally a supporting-base 1, which is provided with the rectilinear ways 2 to receive the longitudinally-movable frame 3, and at the opposite end of the base is provided the horizontal supporting-surface 4 to receive the rotatable turret or carrier 5, the latter being provided with a cylindrical extension 6, which enters a correspondingly-shaped chamber 7 of the supporting-base and forms an axis about which the carrier rotates as a center. Concentrically with the chamber 7 are formed the segmental guideways 8 and 9, respectively, which are arranged exteriorly of the base and support the rotatable frame 10 in such a manner that it is capable of being shifted around the supporting-base in an arc concentric with the cylindrical axis 6 of the carrier 5, an antifriction-roller 11 being preferably provided to bear upon the upper side of the segmental rack 12 to reduce the friction caused by the shifting motion of the carrier, a bracket 13 being preferably formed on the latter and provided with a revoluble spindle 14, the lower end of which carries a pinion 15, which coöperates with the rack 12, the upper end of the spindle being provided with a ratchet 16, with which coöperates the reversible pawl 17, which is carried by the operating-handle 18, the latter being revolubly fitted over the spindle and capable of being manipulated manually to rotate the spindle 14 through the coöperation of the ratchet 16 and pawl 17, a spring-operated stop 19 being provided for retaining the pawl 17 in locked position, such a construction permitting the frame 10 to be readily shifted into any desired position upon the supporting-base, and through its connections with the tool-carrier the latter may be adjusted to correspond with the pitch-cones of the gears to be generated.

In the supporting-base is provided a bearing 20, in which is revolubly fitted the main driving-shaft 21, the latter being provided upon its outer end with an ordinary pulley or other power-transmitting device 22, and upon its inner end is provided a bevel-gear 23, which meshes with a corresponding gear 24, which is fixed upon the vertical shaft 25, the latter being mounted concentrically of the extension 6 and provided at its upper end with the bevel-gear 26, and also meshing with the gear 24 is a corresponding gear 27, which is fixed upon the shaft 28. The latter is mounted in a bearing 29, which is fixed to the movable frame 10 and capable of swinging radially about the shaft 25 as an axis, the connection between this shaft and the bevel-gear 24 being such that it may receive motion continuously irrespective of the position of the said frame relatively to the supporting-base, and upon the outer end of the shaft 28 is provided the gear 30, which meshes with a corresponding gear 31, which is fixed upon the shaft 32, the latter being also mounted upon the movable frame 10 and provided with a worm 33, which meshes with a worm-wheel 34, which is fixed to the transversely-arranged stud-shaft 35, the latter being revolubly mounted in a bearing 36, which is also fixed to the frame 10, and this shaft 35 carries upon its opposite end a pinion 37, which is arranged to coöperate with a bevel-gear 38, which is fixed to the vertical stud-shaft 39, the latter being supported upon a bearing-bracket 40, which is fixed to the movable frame 10.

Fitting loosely over the extended portion 35$^a$ of the stud-shaft 35 is mounted a sleeve 41, to which is connected a crank 42, carrying at its outer end a stop 43 for the purpose that will be hereinafter described, a guideway 44 being preferably provided on an arm movable with the crank 42 and adapted to receive a crank-pin 45, which serves to adjustably connect the crank with the connecting-rod 46. Mounted on the rotatable sleeve 41 is a clutch member 47, which is connected to the said sleeve by the spline 48, which permits a relative longitudinal motion of the said member upon the sleeve and operates to transmit a rotary motion between the parts, and adjacent to this clutch member 47 is a corresponding member 49, the latter being fixed rigidly to the wheel 34. With the clutch member 47 coöperates an operating member 50, which is fixed to the shaft 51, which is capable of a relatively longitudinal motion, one end thereof being arranged to coöperate with the stop 43 of the crank 42 when it is shifted in one direction to arrest the rotation of the crank 42, and upon its other end is provided a projection 52.

On the upper end of the stud-shaft 39 is fixed a cam 53, which carries upon its periphery the spiral cam 54, which is arranged to coöperate with the projection 52 on the longitudinally-movable shaft 51 to shift the latter at predetermined intervals, such an operation serving to disengage the stop 43 from the adjacent end of the said shaft and to engage the respective clutch members 47 and 48 to cause the rotary motion of the wheel 34 to be transmitted to the crank 42, and when the said shaft is shifted in the opposite direction, under the action of a suitable spring 51$^a$, Fig. 11, after the disengagement of the projection 52 thereon from the cam 54, the clutch members 47 and 48 will be disengaged and the stop 43 will coöperate with the adjacent end of the said shaft to arrest the motion of the crank.

On the upper face of the wheel 38 is provided a stop or projection 55, which is arranged to coöperate with a corresponding member 56, which is carried upon a longitudinally-movable rod 57, the latter being operated in one direction by the spring 58 and in the opposite direction by the coöperative engagement of the stop 55 and the member 56 during the rotation of the wheel 38, the stop 55 disengaging from the member 56 when the rod 57 has been operated a predetermined distance, by reason of the fact that this stop moves in a circular path about the shaft 39 as a center, as will be obvious in referring to Fig. 12, and upon this rod 57 is mounted a pawl 59, which is arranged to coöperate with the ratchet-wheel 60. This wheel 60 is mounted in the bracket 61, which is fixed to the movable frame 10, and it carries a pinion 62, which coöperates with the segmental rack 63, which is formed on an arc struck from the center of motion of the frame 10 and is capable of being shifted circularly around the supporting-base, the connection between the pawl 59 and the ratchet 62 being of such a nature that the motion may be transmitted between these parts irrespective of the relative position of the movable frame 10 on the supporting-base, one end of this movable rack 63 being connected by the link 64 with a crank 65 on the rock-shaft 66, so that oscillatory motion may be imparted to the latter by the relative motion of the rack, a spring 67 being employed for returning the rack to its normal position subsequently to the operation thereof by the stop 55 and its connections.

On the upper face of the cam 53 is provided a cam-slot 68, (see Fig. 11,) which is adapted to receive an operating roller or projection 69, the latter being connected to the swiveled support 70, which is pivotally mounted upon the bracket 71 of the movable frame 10 at the point 70ª, and adjacent to this support 70 is arranged the operating-arm 72, which is rigidly connected to the rotatable turret or carrier 5, a radially-arranged slot being provided in the said arm to receive a cross-head 73, which is operatively connected to the support 70 and is capable of being adjusted longitudinally in the slot of the arm 72 by the adjusting-screw 74, the construction being such that by manipulation of the screw 74 the cross-head 73 may be so positioned in the slot of the arm 72 that the angle of motion which is transmitted from the cam-slot 68 through the support 70 to the operating-arm 72 may be varied within the desired limits, so that the carrier 5 may rotate through a given angle.

The operative connection between the tool-carrier and the frame 10, embodying the tool-feeding cam 53 carried by the latter, the pivoted support 70, having the operating projection 69 coöperating with the cam, and the cross-head 73, operatively connecting the support 70 and the radial arm 72 on the carrier, serves not only to impart the necessary horizontal swinging movement to the carrier to feed the tools toward and from the blank, but the connection above described also serves to shift the tool-carrier to bring the tools into operative position corresponding to the pitch-cones of the gears when the frame 10 is rotated about the base of the machine, so that adjustment of one of these parts effects adjustment of the other.

To the connecting-rod 46, which is operated by the crank 42, is connected the cross-head 75, which is fixed to the vertically-movable guide 76, the latter being slidingly mounted in upper and lower bearings 77 and 78, respectively, the said guide 76 and its supporting-bearings being both movable with the frame 10, and the connection of the cross-head 75 thereof with the crank 42 through the connecting-rod 46 will cause the rotary motion of the crank to impart a vertically-reciprocatory motion to the cross-head 75.

The longitudinally-movable frame 3, which is capable of being moved on the supporting-base in a direction radially of the turret or carrier 5, is provided with a nut 79, which coöperates with the operating-screw 80, the said nut being fixed to the said frame by means of bolts 81 and the securing-screws 82, and upon this frame are mounted the bearing-standards 83, in which is revolubly-mounted a sleeve 84, which is provided with a spline or feather 85, and within this sleeve is revolubly mounted the arbor 86. Upon one end of the sleeve 84 is attached the arm 87, and upon the adjacent end of the arbor 86 is fixed a worm-wheel 88, the latter coöperating with the worm 89, which is fixed to the spindle 90, the latter being supported in the bearings 91, which are attached to a supporting-plate 92. This supporting-plate 92 is attached to the arm 87 by the securing-bolts 93, a key 94 being arranged between the supporting-plate 92 and the arm 87 to permit the worm 89, carried by the said plate, to be accurately adjusted relatively to its corresponding worm-wheel 88, an adjusting-screw 95 being provided between the said arm and the supporting-plate for the purpose of adjusting these parts and locking them in relative adjusted position.

On the spindle 90 is mounted an operating-stem 96, which is rigidly attached thereto, and fixed to this stem is a clutch member 97, which is arranged to coöperate with the corresponding clutch member 98, which is loosely mounted on this stem and fixed to a pinion 99, a clamping-head 100 being threaded upon the stem 96 and arranged to operate upon the relatively movable clamping member 98 to engage and disengage it from its corresponding clutch member 97, which is fixed to the stem. This construction enables the pinion 99 to be temporarily disconnected from the stem 96 and its connected parts, so that the latter may be rotated or adjusted in any desired position, manipulation of the clamping-head 100 serving to lock the pinion in fixed relation to the stem 96 and the spindle 90.

With the pinion 99 are adapted to mesh the change-gears, which are carried by the swiveled support 101, the construction of the latter being such as to accommodate gears in various combinations and of different dimensions, and for this purpose this support is pivoted on the shaft 102, which is mounted in the bearing-brackets 103 of the supporting-plate 92, and it is provided with a segmental slot 104, which coöperates with a clamping-bolt 105, which is carried by a relatively fixed part of the adjacent bearing 103, and upon the lower end of this bracket is provided a radial slot 106, with which coöperates the stud-shaft 107, which serves as a bearing for the change-gears 108, which mesh, respectively with the pinion 99 of the spindle 90 and with the gear 109, which is fixed to the shaft 102. This construction enables the change-gears 108 to be brought accurately into mesh with the gear 109 by adjusting the stud-shaft 107 within the slot 106, and the corresponding change-gear may be brought into accurate mesh with the pinion 99 and secured in such a relation by the clamping-screw 105, which is fixed to the bearing-bracket 103 and coöperates with the segmental slot 104.

To the shaft 102 is fixed a cam 110, with which coöperates the projection 111 of the pivoted arm 112, the cam being provided with an incline in its periphery, which is so located that it will engage the projection 111 at a predetermined point in its rotation, and as the projection 111 of the arm 112 is held yieldingly in engagement with the periphery of the cam by the action of the spring 113 the action of the projection 111 will normally tend to rotate the cam to a predetermined position while it is on the incline thereof, as shown in Fig. 5. Fixed to the cam 110 and rotating therewith is a disk 114, which is provided with a notch 115 in its periphery, the latter being arranged to coöperate with a movable stop 116, which is carried by the guide 116' and which occupies a relatively fixed position, the relative positions of the notch 115 and the incline in the periphery of the cam 110, which coöperates with the projection 111, being such that when the disk 114 is permitted to rotate by the disengagement of the stop 116 and the notch 115 the rotary motion will continue until the notch reaches the stop, and at this time the projection 111 will be on the incline of the cam and under the action of the spring 113 and will insure the complete rotation of the disk 114 until the notch 115 therein is in proper engagement with the stop 116.

The shaft 102 carries upon one end a bevel-gear 117, which is rigidly fixed thereto and arranged to mesh with the bevel-gear 118, which is mounted upon a radial bearing-arm 119, the inner end of the latter being journaled upon the sleeve 120, which is fitted over the reduced portions 121 of the shafts 102 and 122, the outer end of this arm being fixed to the casing 123. These shafts are mounted at their adjacent ends within the hollow casing 123 and are arranged in alinement, the inner end of the shaft 122 having fixed thereto a bevel-gear 124, which corresponds with the gear 117 of the shaft 102 and meshes with the pinion 118.

On the periphery of the casing 123 are formed the teeth 125, which are arranged to mesh with the worm 126, the latter being mounted on the stud-shaft 127, which is journaled in the bearing 128 in alinement with the sleeve 84 and arbor 86 and carries at its outer end a bevel-gear 129. This bevel-gear meshes with the corresponding gear 130, fixed to the upper end of the inclined shaft 131, which is mounted in the bearings 132 and 133, respectively, the lower end of the shaft carrying a bevel-gear 134, which meshes with the corresponding gear 135 of the longitudinal shaft 136, this gear 135 being journaled in a bracket 137, which is movable with the frame 3 and is provided with a key 138, which coöperates with a longitudinal keyway 139 in the shaft 136, so that the rotary motion of the latter may be transmitted to the shaft 131 through these bevel-gears irrespective of the relative longitudinal position of the frame 3. This longitudinal shaft 136 is mounted in the bearings 140 and carried upon its opposite end the bevel-gear 141, which meshes with a corresponding gear 142, which is fixed to the main driving-shaft 21.

On the shaft 122 is fixed a stop-wheel 143, the periphery of which is preferably roughened or serrated, and adjacent to the periphery of this wheel is mounted the movable stop 144, which is capable of being moved vertically in its support 145, so as to engage and disengage the periphery of the wheel 143, so as to control its motion. The stop 144 and the stop 116 are operatively connected by the pivoted link 146, so that these stops will operate in unison, but in opposite directions, a spring 147 being arranged to bear upon this link in such a manner as to normally retain the stop 116 in engagement with the notch 115 in the periphery of the disk 114. The lower end of the stop 144 is provided with an inclined surface 148, which is arranged to coöperate with the projection 149, which is carried by the pivoted arm 150, and adjacent to this arm 150 is mounted the rock-shaft 66, which is provided with a longitudinal keyway 66ᵃ to receive a key 151, which serves to connect the said shaft with an arm 152, the latter being arranged between the bearing-bracket 153 and the support 154, so that it may be moved longitudinally along the rock-shaft 66 by the corresponding motion of the frame 3, and it will still be capable of receiving the rotary motion thereof. This arm 152 is provided with a roller or projection 155, which is arranged to coöperate with the swinging arm 150 to elevate and depress it, and as the projection 149 coöperates with the stop 144 while the parts are in the relative positions indicated in Fig. 7 it will be obvious that the rocking motion of the shaft 66 will cause the arm 152 to raise the arm 150, and through the projection 149 it will move the stop 144 into engagement with the periphery of the wheel 143, and through the link 146 it will simultaneously disengage the stop 116 from the peripheral notch 115 of the disk 114, and as motion is transmitted from the worm 126 to the casing 123 it will be obvious that while the wheel 143 is held locked by the step 144 the shaft 102, carrying the disk 114, the cam 110, and the gear 109, will be free to rotate by reason of the fact that the stop 116 at this time is disengaged from the notch 115, and as this shaft 102 continues to rotate the motion thereof will be transmitted from the wheel 109 to the change-gears 108 and to the pinion 99, and from the pinion 99 it will be transmitted through the stem 96 and the spindle 90 through the worm 89, to the worm-wheel 88, and as this worm-wheel 88 is fixed to the arbor 86 a rotary motion will be imparted to the latter, which will cause the gear-blank, which is carried upon the opposite end thereof, to be rotated through a predetermined angle. This motion will continue until the notch 115 reaches the stop 116, when the latter will be moved upwardly under the action of the spring 147 to arrest the rotation of the disk 114, and simultaneously the stop 144 will be disengaged from the periphery of the wheel 143, causing the motion which is continuously imparted to the casing 123 to be transmitted to the shaft 122.

Over the sleeve 84 is fitted a sleeve 156, which is capable of a relative longitudinal motion thereon and is provided with a keyway 157, which coöperates with the key or spline 85 of the sleeve 84, so that rotary motion may be transmitted between the parts irrespective of their relative longitudinal positions, and to this sleeve 156 is attached a radially-arranged arm 158, which is provided with a segmental gear 159, which is formed thereon concentrically with the sleeve 84. Coöperating with this segmental gear 159 is a rack 160, which is mounted to reciprocate vertically on the guideways 161, the latter being carried by a relatively fixed frame 162, attached to the supporting-base, and upon opposite sides of this rack are provided the trunnions 163, which are arranged in alinement with the pitch-line of the rack, and on these trunnions are journaled the cross-heads 164, which are capable of reciprocating within the guideways 165, which are formed radially within the arms 166, the latter being rigidly attached to one end of the segmental arm 167, one end of which is journaled to rotate upon the sleeve 156, which is fitted over the sleeve 84. The opposite end of this segmental arm 167 is pivotally supported by the bearing-arm 168, which is rigidly supported by the bracket 169, fixed to the supporting-base of the machine, the bearing 168 being arranged accurately in alinement with the arbor 86.

On the turret or carrier 5 is provided a bracket 170, which is provided at one end with a journal 171 for supporting the revoluble shaft 172, and this shaft carries the adjustable crank-disk 173, which is provided with the radial slot 174 to receive the radially-adjustable crank-pin 175, to which the pitman or connecting-rod 176 is secured by the clamp 177, the opposite end of this shaft 172 carrying a sprocket-wheel 178 to receive a power-transmitting chain 179, which is driven by the sprocket 180, the latter being fixed to the gear 181, which is driven by the pinion 182, the shaft 183, which carries the pinion 182, being journaled in a bearing 184, which is preferably formed integrally with the cyindrical extension 6 of the turret or carrier, a bevel-gear 185, which meshes with the corresponding gear 26 of the vertical shaft 25, serving to transmit motion from the latter to the crank-disk 173.

In the bracket 170 of the rotatable carrier 5 is provided a bearing 186, which extends in a direction radially of the center of motion of the carrier, and in this bearing is fitted a stud-shaft 187, which is provided with a head 188, and between the head 188 and the side of the bracket 170 are pivotally mounted the bearings 189 and 190, which are attached to their respective guideways 191 and 192, the latter being supported at their free ends by the support or bracket 193, which has its coöperating surface formed on an arc struck from the shaft 187 as a center to receive the correspondingly-shaped ends of the guideways, so as to permit the latter to be adjusted relatively to each other about their common center, and for this purpose the turnbuckle 194 may be employed for moving the guideways relatively to each other and the locking-bolts 193ª for locking them in adjusted position.

In the ways of the guides 191 and 192 are mounted the longitudinally-movable tool-holders 195 and 195ª, respectively, which are connected to the pitman or connecting rod 176 in any suitable manner that may enable these tool-holders to be reciprocated in their respective guideways at divergent angles with the bearing 186 as a center, about which the tool-holders may swing radially, the adjusting device 194 when operated serving to vary the relative angle through which these tool-holders operate. These tool-holders may be of any suitable construction, those shown embodying a guiding-block 196, which is formed to extend entirely through a longitudinal slot in its corresponding guideway and to engage the opposite surfaces thereof, and it is provided with a compensating wedge 197, which is arranged to engage one of the walls within the slot of the guideway to take up any looseness which may occur, a screw 198 being employed for adjusting it, and extending through the guiding-block is a bolt 199, over which a sleeve 200 is fitted, having one end arranged to engage beneath the bolt-head, and the other bears upon the upper surface of a block 201, which is pivoted to swing laterally about the pivot 201$^a$, said block being so fitted in the guiding-block as to move in a relatively lateral direction to enable the tool to engage and disengage from the work on the forward and return strokes, and this block 201 is provided with a socket to receive the opposite end 199$^a$ of the clamping-screw 199, which is forked or yoke-shaped to receive the jaws 202. These jaws are compressible and are formed to receive the operating-tool 205, the cutting-surface of which is usually formed at approximately an angle of fifteen degrees, or, in other words, to correspond to the angle of action of the gear-tooth which is to be cut. These jaws 202, which are adapted to receive the tool, are provided with relatively inclined sides to correspond with the oppositely-inclined surfaces which are formed within the yoked portion 199$^a$ of the bolt 199, such a construction obviously causing the clamping-jaws 202 to be compressed against the sides of the tool when the clamping-screw 199 is tightened.

In order to enable the tools to be properly positioned, it is preferable to form these jaws with their upper faces inclined forwardly to coöperate with the correspondingly-inclined surface of the removable block 201, so that as they are each moved forwardly within their respective tool-holders they will be adjusted toward one another, and in order to insure the proper positioning of these jaws while being set in their holders it is preferable to provide an adjustable stop 205$^a$, which serves to limit the forward motion of the jaws, the tool 205 being movable longitudinally within the jaws while the clamping-bolt 199 is loosened. The sleeve 200, which is interposed between the block 201 and the head of the clamping-screw, operates to prevent relative motion taking place laterally between the guiding-block 196 and the block 201, while the requisite pressure may be produced upon the clamping-jaws 202 by the action of the yoke portion 199$^a$ of the clamping-bolt. The arc-shaped bracket 193, which supports the adjustable ends of the guideways 191 and 192, is provided with a projection 206, which is slidable laterally within a corresponding channel in the block 207, the latter being provided at its under surface with a supporting-plate 208, which is preferably adjustable relatively thereto and arranged to coöperate with the cross-head 75, which is reciprocated vertically by the crank 42 and the rod 46, the block 207 being provided with a lateral projection 209 and block 209$^a$, which is capable of traversing the curved channel 210, which is formed upon the inner surface of the segmental arm 167 concentrically with the center of motion of the turret or carriers.

In setting up the machine for cutting the teeth of bevel-gears the blank for the latter is suitably secured to the inner end of the arbor 86, and the change-gears 108 are arranged in such a combination with the pinion 99 and the gear 109 that the angle of rotation of the blank at each successive operation may be predetermined so that the desired number of teeth may be cut thereon, and the turret or carrier 5 is rotated on the supporting-base, so that the tools which are carried by the guideways 191 and 192 may be brought in proximity to the periphery of the gear, and this accomplished by rotating the frame 10, which is supported on the segmental guides 8 and 9 around the supporting-base by manipulation of the handle 18, which is connected, through the ratchet 16 and the pawl 17, to the shaft 14, rotation of the latter causing the pinion thereon to traverse the segmental rack 12, which occupies a relatively fixed position on the base, the gear 27 remaining in mesh with the corresponding gear 24, so that motion may be transmitted to the operating-shaft 28 from the main driving-shaft 21. At the same time the angle of motion through which the tools operate is adjusted by manipulation of the device 194, which serves to vary the distance between the free ends of the guideways 191 and 192, the relative motion taking place about the shaft 187 as a center, and in order that the angle of motion through which the turret or tool-carrier 5 rotates may be so adjusted that operation of the latter through the cam 68 will cause the tools to move inwardly to the proper depth the angle of motion of the tool-carrier may be adjusted by the screw 74, which operates upon the cross-head 73, which is movable radially in a slot in the arm 72, so that the requisite angle of motion imparted thereto from the cam may be obtained. The frame 3, which is movable radially of the carrier 5, may now be moved inwardly by the screw 80 to bring the gear-blank into operative position.

Assuming that the tool-carrier is in such a position that the tools thereon are out of engagement with the blank and that the latter has been rotated into the initial operative position, the first operation will be caused by the cam 68, which is rotated in the indicated direction by the gears 37 and 38, which in turn are rotated by the wheel 34, meshing with the worm 33, and the latter is mounted on the shaft 32, which is connected by the gears 30 and 31 and to the operating-shaft 28, the latter being connected through the gears 23, 24, and 27 to the main operating-shaft 21. As the roller or projection 69 of the swiveled support 70 rides in the cam-slot 68 of the cam while the latter is operating in the direction indicated by the arrow, Fig. 11, it will be obvious that the operating-arm 72, which is actuated by the cross-head 73 of the support 70 of the carrier 5, will cause the latter to be rotated about the cylindrical portion 6 thereof as a center, and as the segmental arm 167 is in the central position, or a position similar to that shown in Fig. 1, the tools will be fed into the periphery of the gear-blank, operating about the center of motion of the carrier which intersects the axis of rotation of the gear-blank. While these tools are moving in this direction they are being reciprocated continuously within their guideways by the rotation of the crank 173, the latter being connected by the sprocket-wheels 178 180 and sprocket-chain 179 and through the gears 181 and 182, shaft 183, gears 185 and 26 to the vertical shaft 25, which is driven from the driving-shaft 21 through the gears 23 and 24. The feeding of the tools into the gear-blank while the segmental arm 167 occupies a relatively central vertical position will continue until the tools have reached the total depth of the tooth, and at this time the cam 54 on the periphery of the cam 53 will engage the projection 52 on the longitudinally-movable shaft 51, causing the latter to be shifted to disengage from the stop 43 and simultaneously connect the clutch members 47 and 48, and this will cause the crank 42 to be rotated by the operation of the wheel 34. This crank 42 normally occupies the position shown in Fig. 22 while the segmental arm 167 is in its central position; but when it is set into motion it first moves downwardly, operating upon the cross-head 75 to lower the segmental arm until it reaches a predetermined position, and then it will begin to rise until it passes its central position and is moved through a corresponding angle above its central position, the motion of the crank continuing until this segmental arm and the tools are returned to their normal central position, as indicated in Fig. 22, the operation of the crank 42 being interrupted by the disengagement of the cam 54 and the projection 52, which permits the shaft 51 to return under the action of the spring 51$^a$, attached to the clutch-yoke 50, thereby disengaging the clutch members 47 and 48 and coöperating with the stop 43 to arrest the motion of the crank.

During the swinging motion of the tools through the operation of the arm 167 a simultaneous rotary motion in the same direction is imparted to the gear-blank by the arms 166, which are attached thereto and receive a corresponding motion, and the cross-heads 164, which are movable radially within the guideways 165 therein and are journaled on the lateral projections 163 of the rack 160, will cause the latter to be reciprocated vertically on its guideways 161, and while this rack is operating in this manner the segmental gear 159, which is in mesh therewith, will cause the arm 158, which is attached to the sleeve 156, to be oscillated, and as this sleeve 156 will impart a rotary motion to the sleeve 84 through the key 85 the arm 87, attached thereto, will be oscillated. As the spindle 90, carrying the worm 89, is carried by this arm 87, the oscillatory motion of the arm 87 will be transmitted to the worm-wheel 88, which meshes with the worm 89, and from the worm-wheel 88 the motion will be transmitted to the arbor 86, upon which the gear-blank is fixed, causing the latter to be rotated simultaneously and in the same direction as the swinging motion which is imparted to the operating-tools. This rotary motion of the gear-blank should be uniform with the simultaneous swinging motion of the operating-tools, as the latter operate as a tooth of the proper form would coöperate with the corresponding teeth of the gear when completed, and during their swinging motion they generate the teeth of the blank, and to secure this result in a machine of this character which is universally adjustable to accommodate gear-blanks from which gears having pitch-cones of different angles are formed I employ in the present instance the motion-transmitting devices between the tools and the gear-blank which embody the coöperatively-arranged rack and segmental gear 160 and 159, respectively, the former being mounted to reciprocate vertically within its guideways and having an operative connection with the radial extensions of the segmental arm 167, so that the swinging motion of the latter may be transmitted to the vertically-movable rack, and as this rack meshes with the segmental gear 159, which is carried by the radial arm 158, the latter being connected to the supporting-arbor for the gear-blank, the swinging motion of the arm 167 will impart a corresponding rotary motion to the gear-blank, the speed of which will accelerate as the angle of the swinging arm relatively to its central position increases. However, swinging motion is imparted to the arm 167 through the block 209$^a$ and projection 209 of the support 207, the latter operating in a given plane about the supporting-shaft 187 of the tool-supports, and it is obvious that with the turret or carrier occupying various angular positions relatively to the axis of the gear-blank the motion which is imparted to the operating-tools through the support 207 during the operation of the crank 42 will cause a swinging motion to be imparted to the arm 167 through the roller or projection 209; but the angle of motion of the arm 167 will not correspond precisely with the angle through which the tools operate, for it will be obvious that the operating-block 209ª and projection 209 will shift their position relatively to the arm 167, which will tend to decrease the angle through which the arm moves while the tools are swinging through a given angle.

As the rack and segmental gear connection between the arm 167 and the arbor for the gear-blank is designed to impart an accelerating motion to the gear-blank while the arm 167 is operating through a given angle, it will be understood that the diminishing angle through which the said arm moves as it leaves its normal central position will be compensated for by the accelerating angle of rotation of the gear-blank, thereby insuring a substantially uniform motion of the gear-blank and the operating-tools to render an accurate generation of the gear-teeth, even though the angles of the pitch-cones thereof may vary within considerable degrees. This operation of simultaneously rotating the gear-blank and swinging the operating-tools in the plane about the pivot 187 as a center first occurs in a downward direction immediately after the operating-tools have been fed into the blank the depth of the tooth and have approximately formed the two opposite faces of the latter, and as the swinging motion of the blank and the operating-tool progresses the lower point of the upper tool will begin to cut the curve for the flank of the adjacent tooth-surface, the rotation of the blank as it progresses causing the tooth which is being operated upon to be gradually drawn away from the operating-tool for the reason that the tools at this time are swinging about the pivot 187 as a center, while the teeth of the blank are moving in a plane at an angle to the plane of motion of the tool and are being swung radially about the arbor 86 as an axis.

As the simultaneous swinging of the blank and of the tools in their respective planes progresses and the edge of the upper tool is gradually leaving the flank of the tool and traversing the adjacent side thereof the cutting edge of the opposite tool is at the same time operating to cut away the metal on the proper contour for the face at the opposite side of the tooth, this swinging motion of the blank and operating-tools in one direction completing the operation of forming the face of one side and the flank at the opposite side of a tooth. The operating-crank 42 at the moment the swinging motion in one direction is completed will occupy its lowermost position, a continued rotation thereof causing it to rise, and thereby elevate the rocking arm 167, passing the central position of the latter, at which point the operating-tools were fed radially into the periphery of the blank to approximately form the sides of the tooth, and as the tools continue upwardly the lower tool will begin to operate upon the adjacent flank of the tooth in a manner similar to that describing the operation of the upper tool in forming the corresponding opposite surface of the tooth, the cutting-surface of the upper tool at the same time operating upon the adjacent face or tip of the tooth to properly shape it as the tooth swings away from the tool in a circular path, and when this operation has been completed both faces of the tooth have been correctly formed by their respective tools, continued operation of the crank 42 bringing the tools, and consequently the arm 167, into its normal central position, as shown in Figs. 1, 6, and 17. When the blank and the tools have both reached the relatively central position, the cam 68 will operate upon the arm 72 to retract the turret or carrier 5, and thereby remove the tools from operative position, relatively to the tooth of the gear-blank which has just been formed. When the tools have been completely withdrawn, the stop 55, which rotates with the gear 38, and the cam 68 will have reached such a position as to engage the projection 56, which is carried by the longitudinally-movable rod 57, causing the latter to be reciprocated, and this will move the pawl 59 into engagement with the ratchet-wheel 60, causing the latter to be rotated, and thereby through the pinion 62 to impart a circular motion to the rack 63, and as the rock-shaft 66 is connected to the rack 63 by the rod 64 and crank 65 a rotary motion will be imparted to the rock-shaft, which will cause the arm 152 to coöperate with the arm 150 to cause the projection 149 thereon to elevate the stop 144. This will bring the stop 144 into engagement with the periphery of the wheel 143, arresting the rotation thereof, and simultaneously causing the stop 116 to be lowered and disengaged from the notch 115 in the periphery of the disk 114, the motion of the stop 144 being transmitted to the stop 116 through the pivotal connection 146.

As rotary motion is continuously imparted to the casing 123 through the worm 126 and rotation of the wheel 143 at this time is prevented by the stop 144, it will be obvious that the motion of the casing 123 will be transmitted to the shaft 102 through the pinion 118, which is carried by the casing and coöperates with the gear 124 of the shaft 122 and the corresponding gear 117 of the shaft 102, and as the gear 118 is held in fixed relation relatively to the casing the motion will be imparted to the gear 117 of the shaft 102 at an increased speed. To the shaft 102 is fixed the gear 109, which operates the change-gears 108, and through the pinion 99 motion is imparted to the spindle 90, to which is fixed the worm 89, which coöperates with the worm-wheel 88, and from the latter rotary motion is imparted to the arbor 86, causing a corresponding rotation of the gear-blank which is fixed thereto. The angle through which the gear-blank is rotated at each successive operation of the mechanism just described will be so adjusted by the change-gears 108 as to divide the periphery or surface of the blank into the proper number of spaces, which will be determined by the number of teeth which are to be cut. This mechanism just described for rotating the gear-blank will continue to operate until the peripheral notch 115 of the disk 114 reaches the stop 116, when it will be engaged by the latter, and as the stop 116 moves into the notch 115 under the action of the spring 147 bearing on the link 146, Fig. 7, the stop 144 will simultaneously disengage from the wheel 143, permitting the latter to resume its motion, the projection 111 at this time coöperating with the inclined surface of the cam 110 to insure the complete rotation of the disk 114, so that the notch 115 therein will remain in fixed engagement with the stop 116, the projection 111 operating under the action of the spring 113.

After each successive operation of the blank-operating mechanism the gear-blank will be centered in position to receive the operating-tools for cutting the next tooth, and these tools are brought into operative position through the operation of the cam 68, which operates upon the arm 72 through the member 70 to rotate the turret or carrier 5 in a manner that has been hereinbefore described, the cycle of operations recurring at predetermined intervals for cutting each tooth successively, and this cycle of operations continues until the blank has been completely rotated and the opposite faces of each tooth have been operated upon respectively by the upper and lower operating-tools.

In order to accommodate blanks of different diameters, it is preferable to employ the longitudinally-movable frame 3, which carries the arbor 86 and also the operating mechanism for rotating the blank, the rock-shaft 66 and the operating-shaft 136 being provided with longitudinal keyways or other suitable devices with which their respective parts coöperate, so that the frame 3 may be shifted longitudinally to any desired position, while the rotary motion of these shafts will be transmitted to their respective parts without interruption, and for this reason the key or spline 85 is formed upon the sleeve 84 and arranged to coöperate with the sleeve 156, so that rotary motion may be transmitted to the latter from the sleeve 84 irrespective of the various positions which the longitudinally-movable frame 3 may occupy. The segmental arm 167 is also employed in the present instance because it enables the plane of action of the operating-tools to be adjusted so as to correspond to the various angles of the pitch-cones of different gears which are to be formed, and as the center of motion of the tools and carrier will coincide with the apex of each gear to be formed the correct generation of the teeth of gears of different dimensions is insured. The adjusting-screw 74, which is carried by the support 70, is also preferably employed, for it enables the depth to which the tools are fed into the blank to be readily adjusted, so that it may correspond to the depth of the gear-tooth which is to be formed, the adjustment being effected through variations in the angles through which the carrier operates. Of course in operating upon gears of differing diameters the operating-tools should be adjusted in range of the tooth by manipulation of the clamping device 177, which connects the pitman 176 with the crank-pin 175, and the distance through which the tools reciprocate should be likewise adjusted according to circumstances by varying the throw of the crank 173 by adjusting the position of the pin 175 thereon.

A machine constructed in accordance with my invention is capable of accurately forming the teeth of bevel-gears by the peculiar construction and arrangement of the various devices whereby the blank is properly brought into operative position, and the tools are fed forwardly into the blank, and while the tools and the blank are in coöperative relation the tools and the blank are simultaneously swung upon their respective axes, the relative motion of the tools and the blank being such as to form proper contours upon the faces of the teeth, the successive operations of rotating the blank, feeding the tools, swinging the tools and the blank in the relation described, and retracting the tools being performed automatically through the operation of their respective operating devices. Moreover, the principle of rotating the blank in a plane about its geometrical axis and imparting a simultaneous swinging motion to the operating-tools about a point which is coincident with the apex of the pitch-cone of the gear being formed insures the correct generation of the teeth, and by the use of the operating devices hereinbefore described for manipulating the gear-blank and the operating-tools which are arranged to coöperate therewith the formation of the gears is rendered expeditious, and the machine is automatic in its operation.

I claim as my invention—

1. In a machine for generating bevel-gears, the combination with suitable supports for the gear-blank and the operating-tool, said supports being capable of relative angular adjustment to accommodate gears having pitch-cones of different angles, of means for swinging the gear-blank on its axis and simultaneously operating the tool in a path tangential to the gear-blank, and means for automatically proportioning the relative speed of movement of the pitch-surface of the gear-blank and the coöperating tool according to the angular relation of the planes in which they operate to generate the curves of the gear-teeth by evolution.

2. In a machine for generating the curves on the working faces of bevel-gear teeth, the combination with a support for centering a gear-blank on its axis, and a tool-support adapted to guide a tool to operate in a path tangential to the pitch-surface of the gear to be generated, the blank and tool supports being capable of adjustment for operation in different angular relations to accommodate gears having pitch-cones of different angles, of means for simultaneously swinging the blank and tool supports in their respective paths with an equal velocity of movement of the pitch-surface of the blank and the coöperating tool, the generating movements of the tool and blank being proportioned automatically at all relative angular adjustments of the blank and tool supports.

3. In a machine for generating bevel-gears, the combination with a support for rotatably centering a gear-blank on its axis, and a tool-support mounted to swing on an axis and adapted to guide an operating-tool in a path tangential to the pitch-surface of the gear to be generated, the axes of the blank and tool supports being capable of angular adjustment to accommodate gears having pitch-cones of different angles, of means for simultaneously swinging the blank and tool supports in their respective paths, and devices for automatically proportioning the swinging motions of the blank and the tool in ratios varying according to the angular relation of the paths in which the blank and tool operate to maintain equal velocity of motion of the pitch-surface of the blank and the coöperating tool.

4. In a machine for generating the teeth of bevel-gears, the combination with the supports for the gear-blank and operating-tool, said supports being mounted to swing in planes in different angular relations to accommodate gears having pitch-cones of different angles, of means for simultaneously swinging the supports through predetermined relative angles, and means for automatically proportioning the relative swinging movements of the blank and tool according to the angular adjustments of the supports to produce an equal velocity of the tool and the pitch-surface of the gear being generated.

5. In a machine for generating the teeth of bevel-gears, the combination with the supports for the gear-blank and operating-tool, said supports being mounted to swing in paths arranged in different angular relations to correspond with gears having pitch-cones of different angles, of means coöperating with the said supports at all positions of relative adjustment thereof for automatically proportioning the relative swinging motion of the supports to cause an equal velocity of the tool and the pitch-cone of the gear to be generated, irrespective of the angular relation of the planes in which the tool and gear-blank operate.

6. In a machine for generating the curves of bevel-gear teeth, the combination with a support for centering a gear-blank on its axis, a turret mounted to rotate on an axis arranged transversely to that of the blank, and a tool-support mounted on an axis carried by the turret and adapted to guide an operating-tool in a path tangential to the pitch-surface of the gear to be generated, of an arm mounted to swing on an axis coincident with the axis of the gear-blank and having ways therein formed concentrically with the axis of the turret, and operative connections between the said arm and the gear-blank and operating-tool for imparting equal velocity of movement of the pitch-surface of the blank and the coöperating tool.

7. In a machine for cutting bevel-gears, the combination with a work-support for centering the gear-blank on a given axis, and a tool capable of operating in planes at variable angles relatively to the plane of rotation of the blank, of devices interposed between the blank and the tool for automatically producing equal speed of motion on the pitch-surface of the blank and the tool in their respective planes irrespective of the relative angular relation of the tool.

8. In a machine for cutting bevel-gears, the combination with a work-support for centering the gear-blank on a given axis, and a tool mounted to move in a plane which is perpendicular to the plane of rotation of the blank, and which is also capable of swinging in different planes transversely to the said perpendicular plane, of means for feeding the tool in a direction transversely of the cone-surface, and devices for imparting a simultaneous swinging motion to the blank and the tool in their respective planes.

9. In a machine for cutting bevel-gears, the combination with a work-support for centering the gear-blank on a given axis, and a tool mounted to operate about a point coincident with the axis of the blank and arranged to swing in a predetermined plane about a given axis, of feed devices for moving the tool into engagement with the blank about the said point as a center, and means for simultaneously swinging the blank and the tool about their respective axes.

10. In a machine for generating the teeth of bevel-gears, the combination with a support for centering a gear-blank on a given axis, of a turret mounted to swing in a plane substantially parallel to the axis of the blank for accommodating gears of different cone-angles, a tool-support mounted on the turret and having a tool arranged to swing in planes tangential to the pitch-cone of the gear being generated, means for swinging the said turret on its axis to feed the tool to the blank, and means for simultaneously swinging the blank and tool-support on their respective axes after the tool has been fed to the blank and with a uniform velocity of movement of the tool and the pitch-surface of the blank.

11. In a machine for cutting bevel-gears, the combination with a work-support for centering a gear-blank on a given axis, and a turret carrying a tool mounted to operate in a given plane about a point coincident with the axis of the blank and having an axis about which the tool is capable of swinging in a plane perpendicular to the plane of motion of the turret, of feed devices for moving the turret in a plane about the said point as a center to feed the tool toward the blank, and means for simultaneously swinging the blank and the tool about their respective axes.

12. In a machine for generating bevel-gears, the combination with a support for centering a gear-blank so as to rotate on its axis, of a turret mounted to rotate on an axis in angular arrangement to that of the blank and adjustable to accommodate gear-blanks of different pitch-cones, a tool-support pivotally mounted on the turret and adapted to carry a tool arranged to swing in a path tangential to the pitch-surface of the blank, means for rotating the turret on its axis to feed the tool toward the blank, and means for simultaneously swinging the blank and the tool on their respective axes and means for automatically proportioning the generating movement to cause an equal velocity of movement of the tool and the pitch-surface of the blank in generating bevel-gears having pitch-cones of different angles.

13. In a machine for generating bevel-gears, the combination with a support for centering a gear-blank on its axis, of a turret mounted to rotate in a plane substantially parallel to the axis of the blank, a tool-support mounted to swing on said turret in different planes corresponding to the pitch-cones of the gears to be generated, a frame adjustable concentrically about the axis of movement of the turret, means mounted on said frame and coöperating with the turret for feeding the tool carried thereby into and out of coöperative relation with the blank, and means for simultaneously swinging the blank and tool on their respective axes after the tool has been fed into coöperative relation with the blank for generating the curves of the teeth thereof.

14. In a machine for generating bevel-gears, the combination with a support for centering a gear-blank on its axis, of a turret mounted on an axis arranged transverse to that of the blank, a tool-support pivotally mounted on the turret and arranged to swing in different planes corresponding to the pitch-cones of the gears to be generated, and an operating-arm mounted to swing concentrically with the axis of the gear-blank and having an operative connection with the tool-support for producing simultaneous swinging movement of the blank and the tool on their respective axes for generating the curves of the gear-teeth.

15. In a machine for cutting bevel-gears, the combination with a work-support for centering a gear-blank on a given axis, and a tool-support carrying a tool which is arranged to move in different planes relatively to the axis of the gear-blank, of an operative connection between the tool-support and the work-support-embodying devices for imparting motion in varying ratios to the blank and the tool corresponding with the angular relation of their respective planes.

16. In a machine for generating the working faces of bevel-gear teeth, the combination with a support for centering a gear-blank on its axis, and a tool-support adapted to guide a tool to move in a path tangential to the pitch-surface of the gear, the axes of rotation of the blank and tool being capable of relative angular adjustment to provide for gears having pitch-cones of different angles, of motion-transmitting devices operatively connected to the blank and tool while the axes thereof are arranged in different angular adjustments for imparting simultaneous swinging movement to the blank and tool in ratios corresponding with the different angular adjustments of their axes.

17. In a machine for generating bevel-gears, the combination with a support for rotatably centering a gear-blank on its axis, a turret mounted to swing on a vertical axis for altering the plane of operation of the tool according to the different pitch-angles of the gears to be generated and a tool-support mounted on the turret and arranged to guide an operating-tool in a path tangential to the pitch-surface of the gear, of a segmental arm having ways thereon formed concentrically with the vertical axis of the turret, a projection on the tool-support coöperating with said ways for operatively connecting said arm and the tool-support at all positions of adjustment of the turret about its axis, said arm being mounted to swing about the axis of the gear-blank and devices interposed between said arm and the gear-blank for causing a uniform motion of the pitch-surface of the blank and the tool to generate the curves of the gear-teeth.

18. In a machine for cutting bevel-gears, the combination with a work-support for centering a gear-blank on a given axis, and a tool-support carrying a tool mounted to move in a plane about an axis which is arranged in angular relation to that of the blank, of an arm movable in a plane parallel to that of the gear-blank and operatively connected to the tool-support, a corresponding member operatively connected to the support for the gear-blank, and devices interposed between the said arm and the said member connected to the gear-blank support for causing a uniform motion of the blank and the tool about their respective axes.

19. In a machine for cutting bevel-gears, the combination with a support for centering a gear-blank on a given axis, and a tool-support carrying a tool and mounted to move in a plane about an axis arranged angularly relatively to the axis of the blank, of an arm operatively connected to the tool-support and mounted to swing about the axis of the blank as a center, a corresponding member operatively connected to the support for the gear-blank, and a rack-and-gear connection between the said arms for causing a uniform motion of the blank and the tool about their respective axes.

20. In a machine for cutting bevel-gears, the combination with a support forming an axis about which a gear-blank is adapted to rotate, and a tool-support carrying a tool mounted to rotate about an axis which is in angular relation to that of the blank, and capable of swinging in a plane arranged at a predetermined angle to the axis of the blank, of an arm formed concentrically with the axis of the tool-support and mounted to operate about the axis of the blank as a center, said arm being operatively connected to the tool while the latter occupies different positions around its axis, and devices operatively connecting the said arm and the gear-blank for causing a uniform motion of the tool and the blank on their respective axes.

21. In a machine for cutting bevel-gears, the combination with a work-support for centering a gear-blank on a given axis, a tool-carrier mounted to rotate about an axis arranged in angular relation to that of the gear-blank, and a tool-support mounted to swing in a plane transversely to the plane of rotation of the carrier, of an arm formed concentrically with the axis of the carrier and arranged to rotate about the axis of the blank as a center, said arm being operatively connected to the tool-support at different positions of the tool-support or carrier on their respective axes, and devices operatively connecting the said arm and the gear-blank support for causing a uniform motion of the gear-blank and the tool-support about their respective axes.

22. In a machine for cutting bevel-gears, the combination with a work-support for centering a gear-blank on a given axis, a tool-carrier mounted to rotate about an axis arranged in angular relation to that of the gear-blank, and a tool-support mounted on the carrier and arranged to swing in a plane transversely to the plane of rotation of the carrier, of an arm formed concentrically with the axis of the carrier and mounted to rotate about the axis of the gear-blank, said arm being operatively connected with the tool-support, a second arm operatively connected to the gear-blank support and a rack-and-gear connection between the said arms for causing a uniform motion of the gear-blank and the tool while the tool-support is operating in a given plane.

23. In a machine for cutting bevel-gears, the combination with the work-support for centering a gear-blank on a given axis, a tool-carrier mounted to rotate on an axis intersecting that of the gear-blank and the tool-support mounted on the carrier and arranged to rotate about an axis which intersects the axes of the carrier and the gear-blank, of an arm formed concentrically to the axis of the carrier and mounted to rotate about the axis of the gear-blank as a center, an operative connection between the said arm and the tool-support which is capable of transmitting motion between these parts while they operate about their respective axes, and devices operatively connecting the said arm and the gear-blank support for causing a uniform motion of the gear-blank and the tool-support about their respective axes.

24. In a machine for cutting bevel-gears, the combination with a work-support for centering a gear-blank on a given axis, and the tool-support mounted to rotate about an axis arranged in angular relation to that of the gear-blank, of an arm mounted to rotate about the axis of the gear-blank and having an operative connection with the tool-support while the latter is operating about its axis, a gear operatively connected to the axis, a gear operatively connected to the gear-blank support and the rack operatively connected to the said arm and coöperating with the said gear for transmitting motion between the tool-support and the gear-blank.

25. In a machine for cutting bevel-gears, the combination with a work-support for centering the gear-blank and a tool-support adapted to carry a tool and mounted to rotate in a plane which is arranged at an angle to the plane of rotation of the gear-blank, of an arm operatively connected to the tool-support and mounted concentrically with the gear-blank, a rack mounted to move longitudinally in ways and operatively connected to the said arm and a gear operatively connected to the gear-blank support and coöperating with the rack to transmit motion between the tool-support and the gear-blank while they operate in their respective planes.

26. In a machine for generating the teeth of bevel-gears, the combination with a suitable support for centering a gear-blank on its axis, and a tool-support embodying a pair of pivoted guideways, tool-holders mounted to operate on said ways and carrying tools arranged to operate simultaneously on the opposite sides of a gear-tooth of the blank and means for securing said guideways in fixed angular relation, of means for simultaneously swinging the gear-blank and the guideways of the tool-support in their respective paths and with equal motion to generate the curves of the tooth.

27. In a machine for generating the teeth of bevel-gears, the combination with a suitable support for centering a gear-blank on its axis, and a tool-support embodying a pair of oppositely-arranged guideways mounted on a common axis and adjustable in angular relation, a device for retaining said guideways in fixed angular relation during the cutting operation of the tools, and means for simultaneously rotating the gear-blank and the guideways on their respective axes to simultaneously generate the curves on opposite sides of a gear-tooth.

28. In a machine for generating the teeth of bevel-gears, the combination with a suitable support for centering a gear-blank on its axis, and a tool-support embodying a pair of oppositely-arranged guideways independently adjustable about a common axis and adapted to swing about the said axis as a center, a device connecting the said guideways for adjusting and holding the latter in fixed angular relations, tool-holders mounted to reciprocate on said guideways and arranged to operate simultaneously on the opposite faces of a tooth of the blank, and means for simultaneously swinging the gear-blank and the guideways on their respective axes for simultaneously generating the curves on opposite sides of the tooth.

29. In a machine for generating the teeth of bevel-gears, the combination with a suitable support for rotatably centering a gear-blank on its axis, of a tool-support embodying a pair angularly-arranged guideways mounted on a common axis, an arm connecting the said ways for holding them in fixed relation, an operating-arm having ways formed therein, a block secured to said connecting-arm having a part coöperating with the ways in said operating-arm, and operative connections between the said operating-arm and the gear-blank for causing simultaneous swinging movement to the gear-blank and the tools on their respective axes.

30. In a machine of the character described, the combination with a work-support, of a tool-support embodying oppositely-arranged guideways which are mounted on a common axis, a tool-holder mounted to reciprocate longitudinally of each guideway, a segmental arm formed concentrically with the axis of the guideways and adapted to coöperate with the correspondingly-formed ends of the latter, means for securing the guideways to the said arm in fixed angular relation during the cutting operation of the tools, and means coöperating with the said arm to swing the guideways bodily about their common axes.

31. In a machine of the character described, the combination with a work-support, of a tool-support embodying oppositely-arranged guideways which are capable of being adjusted in angular relation and each being provided with a tool-holder which is mounted to reciprocate longitudinally thereon, an arm formed to coöperate with the guideways and provided with a securing device for locking the said guideways in fixed angular relation and an adjusting device coöperating with the said guideways for varying the angular relation thereof, embodying separate screws attached to the respective guideways and a nut operating on the screws.

32. In a machine of the character described, the combination with a supporting-base and a work-support mounted thereon, of a carrier mounted to rotate on the supporting-base in angular relation to the work-support and having an operating-arm, a tool-support mounted on the carrier provided with operating-tools, an arm pivoted on a relatively fixed part and operatively connected with the said operating-arm and a cam for operating the pivoted arm to rotate the carrier relatively to the work-support.

33. In a machine of the character described, the combination with a supporting-base and a work-support mounted thereon, of a carrier mounted to rotate on said base having an operating-arm, a tool-support mounted on the carrier, a pivoted arm mounted on a relatively fixed part of the base, a cam for operating the pivoted arm through a constant angle and a device connecting the said pivoted arm and arm which is capable of being adjusted to vary the angle of motion which is imparted to the carrier.

34. In a machine of the character described, the combination with a supporting-base and a work-support mounted thereon, of a carrier mounted to rotate on the base and having a radial arm, a tool-support on the carrier, an arm having a relatively fixed pivot, a cam for operating the pivoted arm through a given angle and a connection between the said pivoted and operating arms of the carrier which is capable of adjustment to vary the angle through which the carrier rotates.

35. In a machine of the character described, the combination with a supporting-base and a work-support mounted thereon, of a tool-carrier mounted to rotate in angular relation to the work-support and having an operating-arm provided with a radially-arranged guideway, a tool-support movable with the carrier, an arm mounted to operate about a relatively fixed pivot, a device for operating the pivoted arm through a given angle and a radially-adjustable projection carried by the pivoted and movable longitudinally of the radial guideway of the operating-arm for rotating the carrier to advance and retract the tool relatively to the work-support.

36. In a machine of the character described, the combination with a supporting-base having a work-support mounted thereon, of a tool-carrier mounted to rotate in angular relation to the work-support and having operating-tools thereon, a frame adjustable concentrically with the center of motion of the carrier and operating devices carried by the said frame for imparting rotary motion to the carrier to advance and retract the tools relatively to the work on the work-support.

37. In a machine of the character described, the combination with a supporting-base having a work-support mounted thereon and a main driving-shaft, of a tool-carrier adjustable in angular relation with the work-support, a frame adjustable correspondingly with the carrier, an operating-shaft carried by the frame and mounted thereon to swing in a path concentric with the main driving-shaft, and gearing connecting the operating-shaft to the main driving-shaft irrespective of its relative positions on the supporting-base, and operating devices carried by the frame and actuated by the operating-shaft for rotating the carrier to advance and retract the tools relatively to the work-support.

38. In a machine of the character described, the combination with a supporting-base having a work-support mounted thereon, of a tool-carrier mounted on the base and capable of being rotated into different angular positions relatively to the work-support, a frame adjustable in a circular path around the supporting-base, to correspond with the relative positions of the carrier, operating devices carried on the frame for imparting rotary motion to the carrier and a driving-shaft, an operating-shaft mounted on said frame and arranged to swing about the axis of the driving-shaft, and operatively connected with the devices of the movable frame, and suitable gearing connecting the driving-shaft with the operating-shaft on said frame while the latter occupies different adjusted positions on the supporting-base.

39. In a device of the character described, the combination with the supporting-base and a work-support mounted thereon, of a tool-carrier or turret capable of being rotated in angular relation to the work-support, an operating-arm connected to the carrier, and automatically-controlled means operating at intervals upon the said arm for rotating the carrier through a predetermined angle.

40. In a device of the character described, the combination with the supporting-base and a work-support mounted thereon, of a tool-carrier or turret capable of being rotated in angular relation to the work-support for feeding and retracting the operating-tool, an operating-arm attached thereto and a cam operatively connected to said arm for rotating the carrier through a predetermined angle to feed the tool to the work upon the work-support and for reversing the motion of the carrier to retract the tool at an increased speed.

41. In a machine of the character described, the combination with the supporting-base and a work-support thereon, of a tool-carrier or turret capable of being adjusted in angular relation to the work-support, a radial operating-arm attached to the carrier, a cam operatively connected to the said arm for rotating the carrier to advance and retract the tool relatively to the work on the work-support, and a device interposed between the operating-arm of the carrier and the cam for varying the angle through which the carrier operates.

42. In a machine for generating bevel-gears, the combination with a suitable supporting-base, a support thereon for rotatably centering a gear-blank on its axis, a turret mounted to operate in a plane parallel to the axis of the blank, and a tool-support mounted on the turret and carrying a tool arranged to swing in a plane tangential to the pitch-surface of the gear being generated, of automatic means for operating the turret in its respective plane of movement to feed the tool to the blank and for retracting the tool from the blank, and means for simultaneously swinging the blank and tool on their respective axial supports during the period elapsing between the feeding and retracting movements of the tool, for generating the curves of the gear-teeth.

43. In a machine for generating bevel-gears, the combination with a suitable supporting-base, a support thereon for rotatably centering a gear-blank on its axis, a turret mounted to operate in a plane parallel to the axis of the blank, and a tool-support mounted on the turret and carrying a tool arranged to swing in a plane tangential to the pitch-surface of the gear being generated, of means for operating the turret to feed the tool toward the root of the tooth of the gear being formed, and for automatically withdrawing the tool therefrom, automatically-timed means for simultaneously turning the gear-blank and the tool on their respective axes while the tool is fed into the blank for generating the curves on the working faces of the gear being formed, and indexing devices operating automatically to rotate the blank after the completion of the generating movements and the withdrawal of the tool from the blank.

44. In a machine of the character described, the combination with a supporting-base and a work-support thereon, of a tool-carrier or turret capable of being adjusted in angular relation to the work-support, a tool-support mounted to move in a plane transverse to the plane of rotation of the carrier, an operating-crank having an actuating device arranged to coöperate with the tool-support, an operating shaft and automatically-controlled devices for intermittently connecting and disconnecting the operating-shaft and the crank for imparting motion to the tool-support.

45. In a machine of the character described, the combination with a supporting-base and a work-support thereon, of a tool-support mounted to rotate about an axis in a given plane, and means for periodically operating the tool-support, embodying an operating-crank normally locked in a predetermined position and having a connection which engages the tool-support for imparting motion thereto, a continuously-operating shaft and devices for simultaneously unlocking the operating-crank and connecting the latter with the operating-shaft for operating the tool-support.

46. In a device of the character described, the combination with a supporting-base and a work-support thereon, of a tool-support mounted to swing in a given plane, and means for periodically swinging the tool-support relatively to the work-support, embodying an operating-crank operatively connected to the work-support for imparting motion thereto, a locking device for normally retaining the said crank in a perdetermined position, a continuously-operating shaft, clutch members interposed between the said shaft and the crank and means for simultaneously unlocking the crank and connecting the clutch members to cause operation of the operating-crank.

47. In a machine of the character described, the combination with a supporting-base and a work-support thereon, of a tool-support mounted to swing in a given plane, and means for periodically swinging the tool-support, embodying an operating-crank operatively connected to the said support for imparting motion thereto, stop mechanism for normally locking the operating-crank in a predetermined position to retain the tool-support stationary, an operating-shaft, devices controlled by the stop mechanism for connecting and disconnecting the operating-shaft and crank and means operating upon the stop mechanism to simultaneously unlock the operating-crank and connect the latter with the operating-shaft to swing the tool-support.

48. In a machine of the character described, the combination with a supporting-base and a work-support thereon, of a tool-support mounted to operate in a given plane, and means for swinging the tool-support periodically, embodying an operating-crank connected to the said support for imparting motion thereto, stop mechanism for normally locking the operating-crank in a predetermined position, an operating-shaft, clutch members interposed between the said shaft and the operating-crank and controlled by the operation of the stop mechanism for transmitting motion from the operating-shaft to the said crank, and a cam driven upon the operating-shaft and coöperating with the stop mechanism for operating the latter at a predetermined moment to unlock the operating-crank and simultaneously engage the clutch members.

49. In a machine of the character described, the combination with a supporting-base and a work-support thereon, of a tool-support mounted to operate in a given plane, and means for periodically swinging the tool-support, embodying an operating-crank connected to the said support for imparting motion thereto, a clutch member operatively connected to the crank, an operating-shaft, a corresponding clutch member interposed between the operating-shaft and the crank and arranged to coöperate with the clutch member of the latter, a longitudinally-movable member arranged to coöperate with the operating-crank to lock the latter in a predetermined position, a clutch-actuating device carried by said member and arranged to engage the clutch members and means for operating said member to unlock the operating-crank and simultaneously connect the clutch members.

50. In a machine of the character described, the combination with a supporting-base having a work-support thereon adapted to support a gear-blank, and a tool-support carrying operating-tools, the tool-support capable of being adjusted in angular relation to the work-support and mounted to swing in different planes relatively to the work-support, of a frame adjustable circularly around the supporting-base, a driving-shaft mounted on the supporting-base, an operating-shaft on the said frame and means for maintaining said shafts in operative relation irrespective of the relative position of the frame on the base, and devices carried by the frame and operated by the operating-shaft of the frame for imparting swinging motion to the tool-support.

51. In a machine of the character described, the combination with a supporting-base and a work-support thereon, of a tool-carrier capable of being adjusted in angular relation to the work-support and a tool-support on the carrier and arranged to operate on a given axis in a plane transverse to the plane of rotation of the carrier, of means for operating the tool-support in a given plane, embodying a frame adjustable in a circular path around the supporting-base, a vertically-movable cross-head carried by the said frame and arranged to coöperate with the tool-support for imparting motion thereto, an operating-crank for actuating the cross-head and devices interposed between the operating-shaft and the crank for operating the latter at predetermined intervals.

52. In a machine for generating bevel-gears, the combination with a suitable supporting-base having circular ways formed thereon toward one end, a support on the base for rotatably centering a gear-blank on its axis, a tool-carrier mounted on the base and arranged to rotate on an axis concentric with the said ways on the base, and a tool-support pivotally mounted on the turret and adapted to guide an operating-tool in different planes corresponding with the pitch-cones of the gears to be generated, of means for operating the turret and tool-support in their respective planes embodying a frame adjustable around the circular ways of the base, a cam on said frame operatively connected to the turret for operating the latter on its axis to advance and retract the tool relatively to the blank, and an automatically-timed device mounted on the said frame for swinging the tool-support on its axis while the tool is fed into the blank, means for imparting turning movement to the gear-blank simultaneously with the swinging movement of the tool for generating the curves of the gear-teeth, and means for shifting the position of the said frame on the circular ways of the base to adjust the angular position of the turret and tool-support and their operating devices relatively to the gear-blank axis, to accommodate gears having pitch-cones of different angles.

53. In a machine for cutting gears, the combination with a support, a sleeve rotatably mounted thereon, an arbor revolubly mounted in the sleeve for supporting the gear-blank and devices interposed between the sleeve and arbor for rotating the latter through a predetermined angle and normally forming a positive connection between the arbor and the sleeve, of a tool-support carrying an operating-tool and means coöperating with the tool-support and the sleeve for simultaneously swinging the tool and gear-blank.

54. In a machine for cutting gears, the combination with a support, a sleeve rotatably mounted thereon, an arbor revolubly mounted within the sleeve and adapted to carry a gear-blank, devices carried by the sleeve and operatively connected with the arbor for rotating the latter through a given angle, and an operating-shaft operatively connected to the said devices at different points in the rotation of the sleeve, of a tool-support carrying an operating-tool and means coöperating with the tool-support and the sleeve for simultaneously swinging the tool and gear-blank.

55. In a machine of the character described, the combination with a support, a sleeve rotatably mounted thereon, an arbor revolubly mounted within the sleeve and adapted to carry a gear-blank, devices carried by the sleeve and operatively connected to the arbor for periodically rotating the latter through a given angle and an operating-shaft mounted in axial alinement with the arbor and coöperating with the devices which are carried by the sleeve, of a tool-support carrying an operating-tool and means coöperating with the tool-support and the sleeve for simultaneously swinging the tool and gear-blank.

56. In a machine of the character described, the combination with a support, a sleeve rotatably mounted thereon and provided with a radial arm, an arbor revolubly mounted within the sleeve and adapted to carry a gear-blank, indexing devices carried by the arm of the sleeve and operatively connected with the arbor and an operating-shaft mounted in axial alinement with the arbor for operating the said devices, of a tool-support carrying an operating-tool and means coöperating with the tool-support and the sleeve for simultaneously swinging the tool and gear-blank.

57. In a machine for forming gears, the combination with the tool and work supports, of indexing mechanism embodying a sleeve rotatably mounted on the work-support, an arbor mounted axially within the sleeve and adapted to carry a gear-blank, a spindle journaled in an arm on the sleeve and provided with a worm, and a worm-wheel carried by the arbor and coöperating with the worm of the sleeve and devices for operating the said worm to rotate the arbor relatively to the sleeve, to index the gear-blank relatively to the tool-support.

58. In a machine for cutting gears, the combination with the tool and work supports, of indexing mechanism embodying a sleeve rotatably mounted on the work-support and provided with a radially-projecting arm, an arbor revolubly mounted within the sleeve and adapted to carry a gear-blank, a worm journaled on the arm of the sleeve, a corresponding worm-wheel fixed to the arbor and coöperating with the said worm, devices carried by the sleeve for operating the worm to produce a relative rotation between the sleeve and the arbor to index the blank thereon relatively to the tool-support, and an operating-shaft mounted in axial alinement with the arbor for transmitting motion to the devices on the sleeve.

59. In a machine for cutting gears, the combination with the tool and work supports, of indexing mechanism embodying a sleeve rotatably mounted on the work-support and provided with a lateral arm, an arbor mounted axially within the sleeve and adapted to support a gear-blank, operating devices carried by the arm of the sleeve and operatively connected to the arbor for normally forming a positive connection between the sleeve and arbor and which when operated will produce a relative rotation of the sleeve and arbor to index the gear-blank thereon relatively to the tool-support, an operating-shaft and stop mechanism interposed between the said shaft and the operating devices of the arbor for controlling the operation of the latter.

60. In a machine of the character described, the combination with the tool and work supports, of indexing mechanism embodying a sleeve mounted on the work-support, an arbor rotatably mounted in the sleeve and adapted to center a gear-blank, and operating devices interposed between the arbor and the sleeve for producing a relative motion between them to index the blank relatively to the tool-support, of a continuously-operating shaft and stop mechanism interposed between the said shaft and the said devices controlling the operation of the latter.

61. In a machine of the character described, the combination with the tool and work supports, of indexing mechanism embodying a sleeve mounted on the work-support, an arbor mounted axially within the sleeve and adapted to center a gear-blank, operating devices for producing relative rotation between the arbor and the sleeve for indexing the gear-blank relatively to the tool-support, a continuously-operating shaft, a pair of shafts arranged in axial alinement each provided with an independent stop mechanism, one of said shafts being operatively connected with the operating devices of the arbor means for operating the stop mechanism at predetermined intervals for transmitting the motion of the operating-shaft and means for periodically operating the stop mechanism to alternately connect the axially-alined shafts to the operating-shaft.

62. In a machine of the character described, the combination with the tool and work supports, an arbor mounted rotatably on the work-support and adapted to center a gear-blank thereon operating devices for rotating the arbor to index the blank relatively to the tool-support, a continuously-operating shaft, a pair of oppositely-arranged shafts one of which is connected to the operating devices, stop mechanism coöperating with the said shafts to alternately lock one of them from rotation and simultaneously permit the rotation of the other, and means for transmitting motion from the continuously-operating shaft to the oppositely-arranged shafts under the control of the stop mechanism.

63. In a machine of the character described, the combination with the tool and work supports, and an arbor rotatably mounted on the work-support for supporting a gear-blank, of indexing devices for the gear-blank embodying operating devices for rotating the arbor to index the blank relatively to the tool-support, a pair of oppositely-arranged shafts one of which is connected to the operating devices of the arbor, a stop-wheel carried by each shaft, stop mechanism for alternately engaging the said wheels to simultaneously lock one of the shafts and permit rotation of the other and means for imparting motion to the oppositely-arranged shafts.

64. In a machine of the character described, the combination with a support, and an arbor rotatably mounted thereon, of operating devices for the latter, a pair of oppositely-arranged independently-rotatable shafts, one of which is connected to the operating devices of the arbor, a stop-wheel carried by each shaft, stop mechanism coöperating with the said wheels to alternately lock one of the shafts and simultaneously permit rotation of the other, bevel-gears carried by the shafts, a casing provided with a pinion arranged to coöperate with the said gears and a continuously-operating shaft for rotating the casing.

65. In a machine of the character described, the combination with the tool and work supports, and an arbor rotatably mounted on the work-support and adapted to center a gear-blank thereon, of indexing mechanism for the arbor embodying operating devices for rotating the latter to index the blank relatively to the tool-support, a shaft operatively connected with said devices, a stop-wheel on said shaft having a notch therein, a stop arranged to coöperate with said notch, a cam arranged to rotate with the said shaft and a yieldingly-operated device coöperating with the said cam for retaining the notch of the latter in coöperative relation with the stop.

66. In a machine of the character described, the combination with a supporting-base, a work-support, an arbor rotatably mounted thereon adapted to receive a gear-blank, and indexing mechanism therefor embodying operating devices for rotating the arbor and stop mechanism for controlling the operation of the said devices, of a tool-carrier mounted to rotate in angular relation to the work-support, and a tool arranged to be advanced and retracted for each operation of the carrier, means for rotating the carrier to advance and retract the tool, a rock-shaft having devices for coöperating with the stop mechanism and a device controlled by the carrier-operating means for actuating the rock-shaft to release the stop mechanism while the tool-carrier occupies a predetermined position.

67. In a machine of the character described, the combination with a work-support, an arbor rotatably mounted thereon and supporting a gear-blank, operating devices for rotating the latter, a continuously-operating shaft and stop mechanism for periodically transmitting the motion from the said shaft to the operating devices of the arbor for rotating the latter to index the blank, of a tool-carrier rotatably mounted on the base and carrying the operating-tool, a frame mounted to move around the base in a circular path, an operating-shaft carried by the latter, means interposed between the said shaft and the carrier for periodically rotating the latter through a predetermined angle to advance and retract the tool relatively to the gear-blank, a rock-shaft having devices arranged to coöperate with the stop mechanism to control the operation of the operating devices of the arbor, a segmental rack operatively connected to the rock-shaft and movable in a circular path concentric to the center of motion of the frame, a pinion carried by the latter and coöperating with the rack at different positions of the frame relatively to the supporting-base, an operating projection driven from the operating-shaft and an actuating device operatively connected to the pinion and coöperating with the said projection subsequent to each operation of the carrier for actuating the rack.

68. In a machine for generating bevel-gears, the combination with a suitable support for rotatably centering a gear-blank on its axis, and a pair of pivoted oppositely-arranged guideways adjustable in angular relation according to the pitch-angle of the gear-teeth to be generated, said ways carrying operating-tools arranged to simultaneously operate on the opposite faces of a gear-tooth on the work-support, means for securing said ways in fixed angular relation, and means for rotating the gear-blank on its axis and simultaneously swinging the guideways and their tools in a plane substantially tangential to the pitch-surface of the gear to generate the curves on both faces of a tooth thereof.

69. In a machine for cutting bevel-gears, the combination with a work-support for centering a gear-blank to rotate in a given plane, of a pair of oppositely-arranged tool-supports mounted to move about a point coincident with the axis of rotation of the blank and capable of swinging in a plane arranged angularly to the plane in which the blank operates, an operating-tool mounted to reciprocate longitudinally of each tool-support and provided with angular cutting edges for generating the teeth of the blank, a device for adjusting and securing said tool-supports in fixed angular relation to guide the operating-tools in paths corresponding to the angular relation of the opposite sides of a gear-tooth means for feeding the cutting-tools about the said point as a center to approximately form the tooth and means for swinging the tools and the blank in their respective given planes to generate the curves on both surfaces of the tooth.

JAMES E. GLEASON.

Witnesses:
  G. WILLARD RICH,
  CLARENCE A. BATEMAN.